UNITED STATES PATENT OFFICE.

FRANCIS J. GEIS, OF DOBBS FERRY, ASSIGNOR OF ONE-HALF TO EVAN THOMAS, OF NEW YORK, N. Y.

MIXTURE OR GRIST FOR BREWING PURPOSES.

SPECIFICATION forming part of Letters Patent No. 249,332, dated November 8, 1881.

Application filed December 18, 1880. (No specimens.)

*To all whom it may concern:*

Be it known that I, FRANCIS J. GEIS, of Dobbs Ferry, in the county of Westchester and State of New York, have invented a certain new and Improved Mixture or Grist for Brewing Purposes, of which the following is a specification.

My invention consists in a mixture or grist for brewing malt-liquors, composed of malt and cereals or grain having the cellulose or integument and germ or heart removed, the cereals or grain constituting from about twenty-five to fifty per centum, by weight, of the said mixture or grist. The cereals or grain thus treated have the oily and other objectionable matter removed, but contain the maximum amount of starch and the necessary albumenoids and gluten.

In carrying out my invention I prefer to remove the cellulose or integument and germ or heart of the cereals or grain by means of mechanism which is another invention of mine, and for which I intend to apply for Letters Patent.

I will now describe what I do after the cereals or grain have been prepared.

Before brewing I substitute for preferably from twenty-five to fifty per centum of the weight of malt ordinarily employed to produce a given quantity of the beverage a like weight of the prepared cereals or grain, and mix the two to form a grist. I then subject the combined mass of malt and cereals or grain to treatment by any suitable one of the usual methods employed in the manufacture of lager-beer, beer, ale, porter, or other malt-liquor, according as I desire to produce either of those beverages.

I have found that one hundred pounds of the prepared cereals or grain will equal one hundred and thirty-six pounds of malt in extract or wort (the liquor that runs or is produced before fermentation) for the beverage, and as the prepared cereals or grain are much the cheaper, it is obvious that by means of employing this substitute I very materially cheapen the cost of the beverage. A larger and better quality of yeast of a uniform and vigorous character also results from the use of the prepared cereals or grain.

I do not confine myself to the exact amount of cereals or grain substituted for malt, as they may vary somewhat from the limits named.

The advantages accruing to brewers using my mixture or grist are, first, a very large saving in the cost of raw material, and, second, the wort or unfermented beer contains all the ingredients necessary for the production of a sound and wholesome beverage, and the malt-liquors made under my mixture or grist will keep longer in a warm climate than those made from pure malt alone.

By the use of my mixture or grist all kinds of stock ale and stock lager—that is, malt-liquors which are kept for the purpose of aging—can be made, and give better satisfaction than when made from pure malt alone.

I am aware that a grist composed of malt and grain in its natural state is not new; and I am also aware that it has been proposed to remove from corn the hulls and heart and produce from the remaining portion glucose for use in brewing.

What I claim as my invention, and desire to secure by Letters Patent, is—

A mixture or grist for brewing malt-liquors, composed of malt and cereals or grain having the cellulose or integument and germ or heart removed, the cereals or grain constituting from about twenty-five to fifty per centum, by weight, of the said mixture or grist, substantially as herein specified.

FRANCIS J. GEIS.

Witnesses:
T. J. KEANE,
FREDK. HAYNES.